US011206576B2

(12) United States Patent
Chen et al.

(10) Patent No.: US 11,206,576 B2
(45) Date of Patent: Dec. 21, 2021

(54) RAPIDLY DISSEMINATED OPERATIONAL INFORMATION FOR WLAN MANAGEMENT (71) Applicant: ARRIS Enterprises LLC, Suwanee, GA (US)

(72) Inventors: Wen Chen, San Jose, CA (US); Tsung-Kai Chen, New Taipei (TW); Kun-Nan Tseng, Yunlin County (TW)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/090,580

(22) PCT Filed: Apr. 1, 2016

(86) PCT No.: PCT/US2016/025528
§ 371 (c)(1),
(2) Date: Oct. 1, 2018

(87) PCT Pub. No.: WO2017/171834
PCT Pub. Date: Oct. 5, 2017

(65) Prior Publication Data
US 2021/0014732 A1    Jan. 14, 2021

Related U.S. Application Data (60) Provisional application No. 62/316,444, filed on Mar. 31, 2016.

(51) Int. Cl.
H04W 28/08     (2009.01)
H04W 76/10     (2018.01)
(Continued)

(52) U.S. Cl.
CPC ..... H04W 28/085 (2013.01); H04W 28/0808 (2020.05); H04W 48/16 (2013.01);
(Continued)

(58) Field of Classification Search
CPC ............... H04W 28/085; H04W 76/10; H04W 28/0808; H04W 48/16; H04W 48/20; H04W 84/12; H04W 88/08; H04W 92/20
(Continued)

(56) References Cited

U.S. PATENT DOCUMENTS

2007/0255834 A1\* 11/2007 Abhishek .......... H04W 36/0055
709/226
2012/0201201 A1    8/2012 Liu et al.
(Continued)

FOREIGN PATENT DOCUMENTS

CN    101835243 A    9/2010
CN    102948240 A    2/2013
(Continued)

OTHER PUBLICATIONS

Extended European Search Report, RE: U.S. Appl. No. 16/897,374, dated Jul. 29, 2019.
(Continued)

Primary Examiner — Obaidul Huq
(74) Attorney, Agent, or Firm — Steven Stupp; Stewart Wiener (57) ABSTRACT An access point may utilize fast exchange of operation information with other access points in a wireless local area network (WLAN) to facilitate improved service. In particular, the access point may discover the other access points in a radio-frequency (RF) neighborhood using wireless communication. Then, the access point may exchange operational information with the other access points using dedicated connections. Subsequently, the access point may associate with the electronic device. If the access point determines that a basic-service-set (BSS) transition is warranted based on a criterion (such as the current number of associations with the access point), the access point may
(Continued)

recommend one or more access points in the other access points for the electronic device to associate with based on the operational information, so that the electronic device is able to obtain improved communication performance relative to that provided by the access point.

20 Claims, 9 Drawing Sheets

(51) Int. Cl.
      *H04W 48/16*     (2009.01)
      *H04W 48/20*     (2009.01)
      *H04W 84/12*     (2009.01)
      *H04W 88/08*     (2009.01)
      *H04W 92/20*     (2009.01)

(52) U.S. Cl.
      CPC ........... *H04W 48/20* (2013.01); *H04W 76/10* (2018.02); *H04W 84/12* (2013.01); *H04W 88/08* (2013.01); *H04W 92/20* (2013.01)

(58) Field of Classification Search
      USPC .................................................. 370/216, 221
      See application file for complete search history.

(56) References Cited

U.S. PATENT DOCUMENTS

| | | | |
|---|---|---|---|
| 2014/0355576 A1* | 12/2014 | Wang | .................... H04W 48/16 370/336 |
| 2015/0109912 A1 | 4/2015 | Liu et al. | |
| 2015/0350974 A1* | 12/2015 | Patil | ...................... H04W 28/08 370/331 |
| 2016/0262163 A1 | 9/2016 | Gonzalez et al. | |
| 2017/0019865 A1* | 1/2017 | Wang | .................. H04W 52/241 |

FOREIGN PATENT DOCUMENTS

| | | |
|---|---|---|
| CN | 103826240 A | 5/2014 |
| WO | 2015055871 A1 | 4/2015 |

OTHER PUBLICATIONS

"EP Office Action corresponding to European Patent Application No. 16897374.1-1212, dated Apr. 26, 2021, 14 pages".
Notification of Office Action corresponding to European Patent Application No. 16897374.1 (9 pages) (dated Sep. 19, 2020).
Notification of First Office Action corresponding to Chinese Patent Application No. 201680085952.5 (18 pages) (dated Nov. 4, 2020).

* cited by examiner

RAPIDLY DISSEMINATED OPERATIONAL INFORMATION FOR WLAN MANAGEMENT

CROSS REFERENCE TO RELATED APPLICATIONS

This application claims priority under 35 U.S.C. 371 to International Patent No. PCT/US2016/025528, as filed on Apr. 1, 2016, which claims priority to U.S. Provisional Application Ser. No. 62/316,444, as filed on Mar. 31, 2016, the contents of both which are herein incorporated by reference.

FIELD

The described embodiments relate to techniques for communicating information among electronic devices. In particular, the described embodiments relate to techniques for load balancing in a wireless local area network (WLAN) based on rapid dissemination of operational information.

RELATED ART

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

For example, many electronic devices communicate with each other via wireless local area networks (WLANs) using an IEEE 802.11-compatible communication protocol (which are sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

In principle, the management frames communicated between access points in a WLAN using Wi-Fi can facilitate improved management of the WLAN. For example, an access point may periodically transmit (based on a beacon interval) beacons that include source and destination media access control (MAC) addresses, as well as information about the communication process in the beacon frame body. In particular, the frame body may include: timing information (such as a timestamp value) that enables synchronization of clocks in electronic devices (or stations) that are associated with the access point, a service set identifier (SSID) that identifies a WLAN, supported data rates, parameter settings for different communication techniques (such as frequency hopping spread spectrum, direct sequence spread spectrum, etc.), capability information (such as encryption requirements), and a traffic indication map (TIM) that indicates when there are data frames waiting for a particular electronic device that is using a power-saving mode.

While the management frames provide situational awareness about the access point to the other access points in the WLAN, the information exchanged is limited. Moreover, there can be significant overhead associated with beacon traffic. Consequently, there is a tradeoff between the periodicity and the amount of information included in the frame body with the impact on the WLAN overhead. Therefore, in practice, these restrictions often constrain the ability of access points to obtain topical or current information to facilitate improved management of the WLAN.

Similarly, while a controller can be used to manage the access points in a WLAN, this approach does not scale well. In particular, a controller may have hundreds or thousands of access points in multiple WLANs to manage. Consequently, the controller may not have current information, which may restrict its ability to optimally manage a WLAN. In turn, these limitations may adversely impact the communication performance of a WLAN, and thus may degrade the user experience when communicating in a WLAN via Wi-Fi.

SUMMARY

The described embodiments relate to an access point that facilitates improved service in a wireless local area network (WLAN) that includes an access point and other access points. This access point includes an interface circuit that, during operation, communicates with the other access points and with an electronic device. Moreover, the access point may discover the other access points in a radio-frequency (RF) neighborhood using wireless communication between the access point and the other access points. Then, the access point may exchange operational information with the other access points using dedicated connections between the access point and the other access points. Subsequently, after the access point associates with the electronic device, the access point may determine that a basic-service-set (BSS) transition is warranted based on one or more criteria. Next, the access point may recommend one or more access points in the other access points for the electronic device to associate with based on the operational information, so that the electronic device is able to obtain improved communication performance relative to that provided by the access point.

Note that the RF neighborhood may be based on an RF range of communication with the access point.

Moreover, the operational information may include a capacity of a given access point and RF characteristics of operating channel(s) of the given access point (e.g., a multiband access point may have one operating channel in each band). For example, the capacity of the given access point may be based on a load and a throughput, and/or the RF characteristics may include information specifying a current operating channel, channel noise, channel utilization, etc.

Furthermore, the one or more criteria may include when a number of associations with the access point exceeds a threshold value.

Additionally, the operation information may be exchanged within a time interval, so that the access point has situation awareness about communication performance of the other access points on a time scale corresponding to the time interval. In some embodiments, the operational information is exchanged on an ongoing basis, so that the determination as to whether the BSS transition is warranted can be performed dynamically. For example, the time interval may be sufficiently short that the determination can be performed in real time or near real time.

In some embodiments, the dedicated connections use one of: wireless communication, wired communication or both.

Moreover, the access point may include: a processor; and a memory, coupled to the processor, which stores a program module that, during operation, is executed by the processor.

The program module may include instructions for at least some of the operations performed by the access point.

Another embodiment provides a computer-program product for use with the access point. This computer-program product includes instructions for at least some of the operations performed by the access point.

Another embodiment provides a method. This method includes at least some of the operations performed by the access point.

Another embodiment provides the electronic device that performs counter-part operations to those performed by the access point.

Another embodiment provides a computer-program product for use with the electronic device. This computer-program product includes instructions for at least some of the operations performed by the electronic device.

Another embodiment provides a method. This method includes at least some of the operations performed by the electronic device.

Another embodiment provides a second access point that establishes a mesh network based on operational information this exchanged with other access points using dedicated connections.

Another embodiment provides a computer-program product for use with the second access point. This computer-program product includes instructions for at least some of the operations performed by the second access point.

Another embodiment provides a method. This method includes at least some of the operations performed by the second access point.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An access point may utilize fast exchange of operation information with other access points in a wireless local area network (WLAN) to facilitate improved service. In particular, the access point may discover the other access points in a radio-frequency (RF) neighborhood using wireless communication. Then, the access point may exchange operational information with the other access points using dedicated connections. Subsequently, the access point may associate with the electronic device. If the access point determines that a basic-service-set (BSS) transition is warranted based on a criterion (such as the current number of associations with the access point), the access point may recommend one or more access points in the other access points for the electronic device to associate with based on the operational information, so that the electronic device is able to obtain improved communication performance relative to that provided by the access point.

By identifying opportunities for improved communication performance, this communication technique may result in improved service for users of electronic devices that communication via the WLAN. Moreover, by using a dedicated connections to exchange the operational information, the communication technique may reduce the traffic overhead and a communication latency or time in the WLAN, which may further improve the communication performance and, thus, the service. Consequently, the communication technique may fulfill a long unmet need in communication systems, and may allow more efficient utilization of the WLAN. For example, the communication technique may enable distributed management of the WLAN, including functions such as channel management (to reduce or eliminate interference) and/or establishing a mesh network with the other access points. In turn, these capabilities may reduce the demand for shared resources, such as a controller. Therefore, the communication technique may reduce user frustration when communicating in the WLAN, which may improve the user experience when using the electronic device and the access points.

In the discussion that follows, the electronic device and the access points communicate packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Figure 1:
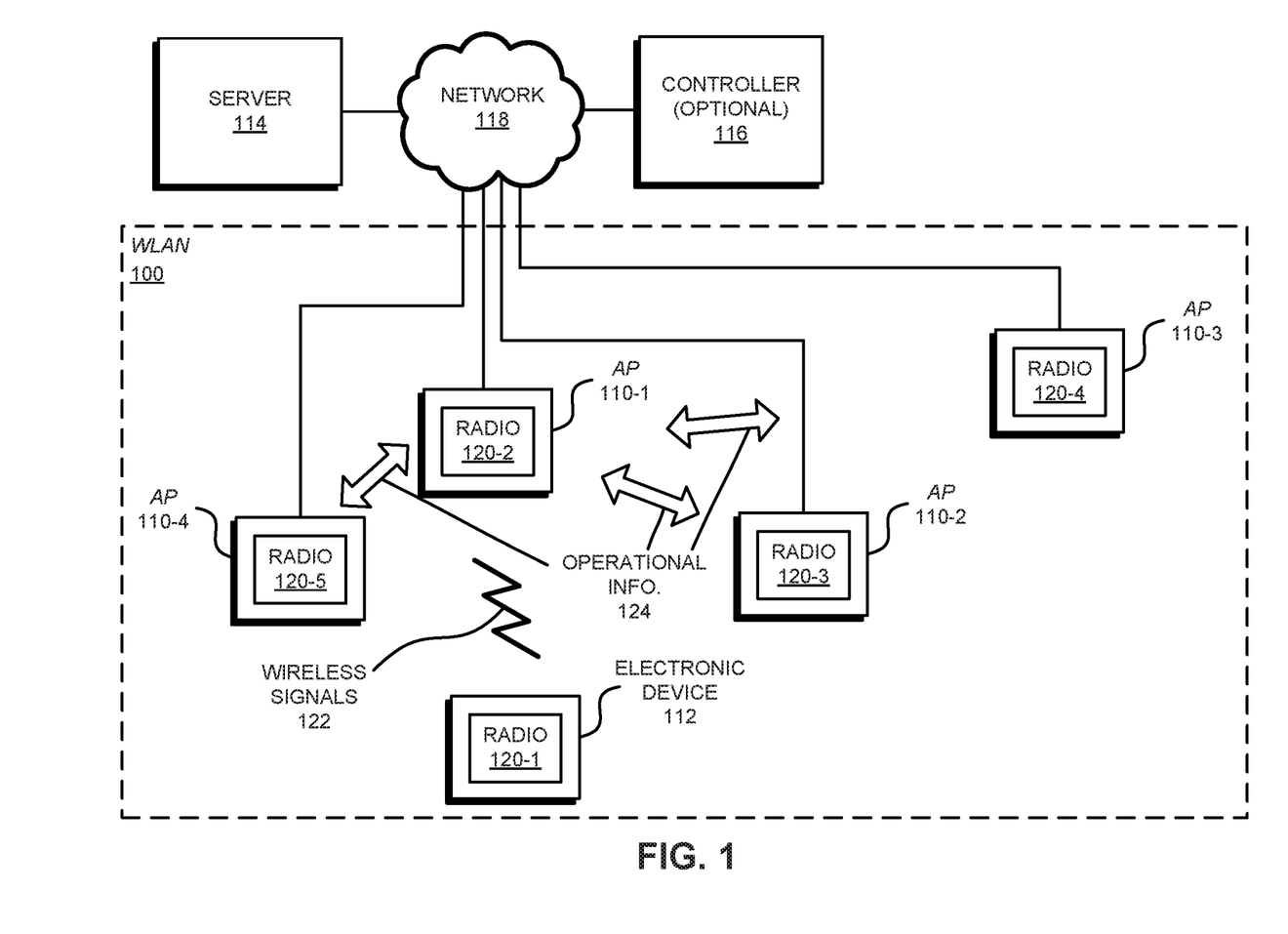
FIG. 1 is a drawing illustrating communication among access points and an electronic device in a wireless local area (WLAN) in accordance with an embodiment of the present disclosure.

FIG. 1 presents a drawing illustrating communication among access points (APs) 110 and an electronic device 112 (such as a cellular telephone) in a WLAN 100 in accordance with some embodiments. In particular, access points 110 may communicate with each other using wireless and/or wired communication, and access points 110 may communicate with server 114 and/or optional controller 116. (However, in some embodiments, optional controller 116 is a virtual controller, such as a controller than is implemented in software in an environment on a server.) In addition, at least some of access points 110 may communicate with electronic device 112 using wireless communication.

The wired communication may occur via network 118 (such as a combination of intra-net, a mesh network, a point-to-point connections and the Internet) and may use a network communication protocol, such as Internet Protocol (IP). Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wireless communication among access points 110 also involves the use of dedicated connections.

In the discussion that follows, note that a mesh network and/or a point-to-point connection, via wired and/or wireless communication, may be referred to as a 'dedicated connection.' Such a dedicated connection may involve an agreed or dedicated association between two access points (which are the start point and the end point, respectively, in the dedicated connection), and the use of a particular channel, as well as optional encryption. Unlike other types of communication shown in FIG. 1, communication via a dedicated connection may be very reliable and fast.

Figure 9:
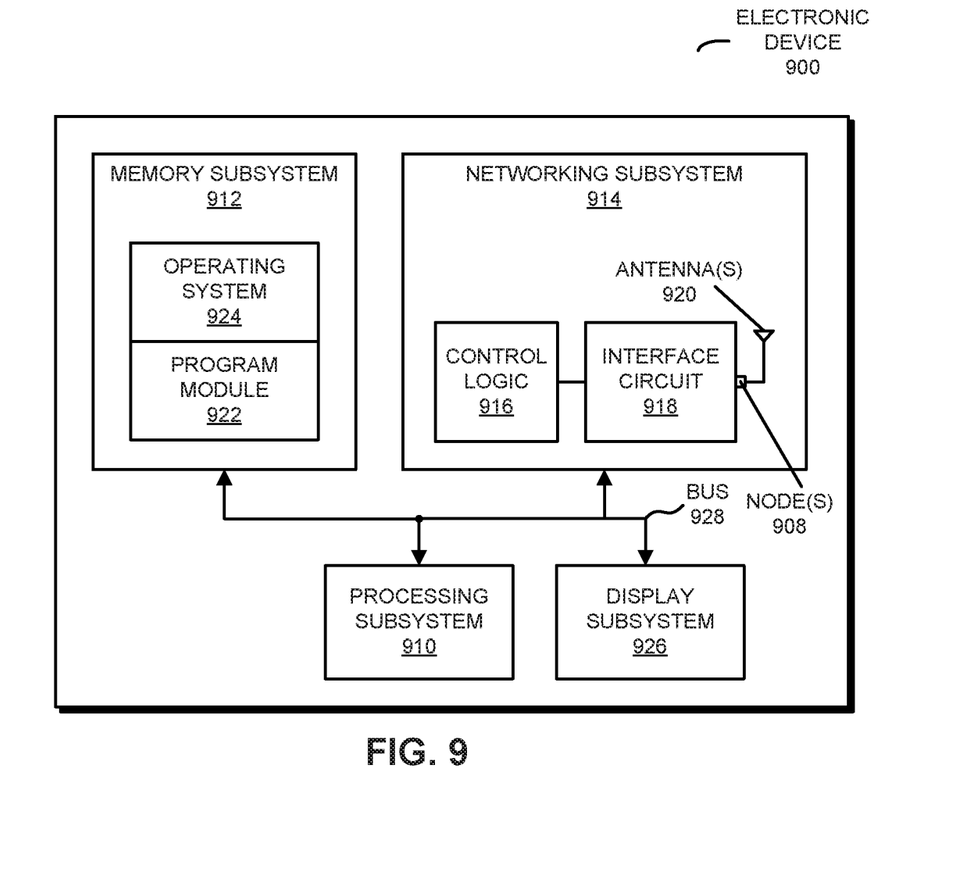
FIG. 9 is a block diagram illustrating an electronic device in accordance with an embodiment of the present disclosure.

As described further below with reference to FIG. 9, access points 110, electronic device 112, server 114 and/or optional controller 116 may include subsystems, such as a networking subsystem, a memory subsystem and a processor subsystem. In addition, access points 110 and electronic device 112 may include radios 120 in the networking subsystems. More generally, access points 110 and electronic device 112 can include (or can be included within) any electronic devices with the networking subsystems that enable access points 110 and electronic device 112 to wirelessly communicate with each other. This wireless communication can comprise transmitting advertisements on wireless channels to enable access points and/or electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic device 112, one or more of these instances may be different from the other instances of radios 120.

As can be seen in FIG. 1, wireless signals 122 (represented by a jagged line) are transmitted from radio 120-1 in electronic device 112. These wireless signals may be received by radio 120-2 in access point 110-1. In particular, electronic device 112 may transmit packets. In turn, these packets may be received by access point 110-1. Moreover, access point 110-1 may allow electronic device 112 to communicate with other electronic devices, computers and/or servers via network 118.

Note that the communication among access points 110 and/or with electronic device 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic device 112 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now further describe communication in WLAN 100. During the communication technique, access point 110-1 may discover and store information specifying access points in an RF neighborhood of access point 110-1 via wireless communication in WLAN 100. (The discovered access points are sometimes referred to as 'other access points'.) For example, access point 110-1 may scan the RF neighborhood or environment using wireless communication between access point 110-1 and the other access points and may identify the other access points. Note that the RF neighborhood may be based on an RF range of communication with access point 110-1. In some embodiments, discovery is based on receiving beacons broadcast by one or more of the other access points. However, in other embodiments, discovery is based on RSSI values (and, more generally, based on one or more measurements performed by access point 110-1) and/or based on information provided by optional controller 116.

Then, access point 110-1 may exchange operational information 124 with the other access points using dedicated connections between access point 110-1 and the other access points. As noted previously, the dedicated connections may involve wireless and/or wired communication (such as via network 118 using IP). Because the communication via the dedicated connections (such as when wireless communication is used) may be fast and reliable, these dedicated links may enable situational awareness among access points 110 on short time scales (such as every few seconds) without incurring significant (or even appreciable) overhead or contention among access points 110 and electronic device 112.

Moreover, operational information 124 may include a capacity of a given access point and RF characteristics of operating channel(s) of the given access point (e.g., a multiband access point may have one operating channel in each band). For example, the capacity of the given access point may be based on a load (or traffic) and a throughput, and/or the RF characteristics may include information specifying a current operating channel, channel noise, channel utilization, etc. In some embodiments, operational information 124 includes one or more communication-performance metrics determined by access points 110 and/or information that is usually included in a beacon frame body. In particular, operational information 124 may include: the capacity of the given access point, the maximum load, the maximum throughput, a current load, a current throughput, a processor type, and/or memory usage.

Furthermore, operation information 124 may be exchanged within a time interval, so that access point 110-1 has situation awareness about communication performance of the other access points on a time scale corresponding to the time interval. For example, the time interval may define a sampling frequency and the inverse of the time scale may be one-half of the sampling frequency. In an exemplary embodiment, the time interval is less than 1, 5 or 10 s, and the time scale is in real time (i.e., on the same order as the time scale of transmitting and receiving frames) or near real time.

In some embodiments, operational information 124 is exchanged on an ongoing basis. This may allow other operations (such as determining whether a BSS transition is warranted) in the communication technique to be performed dynamically.

Figure 2:
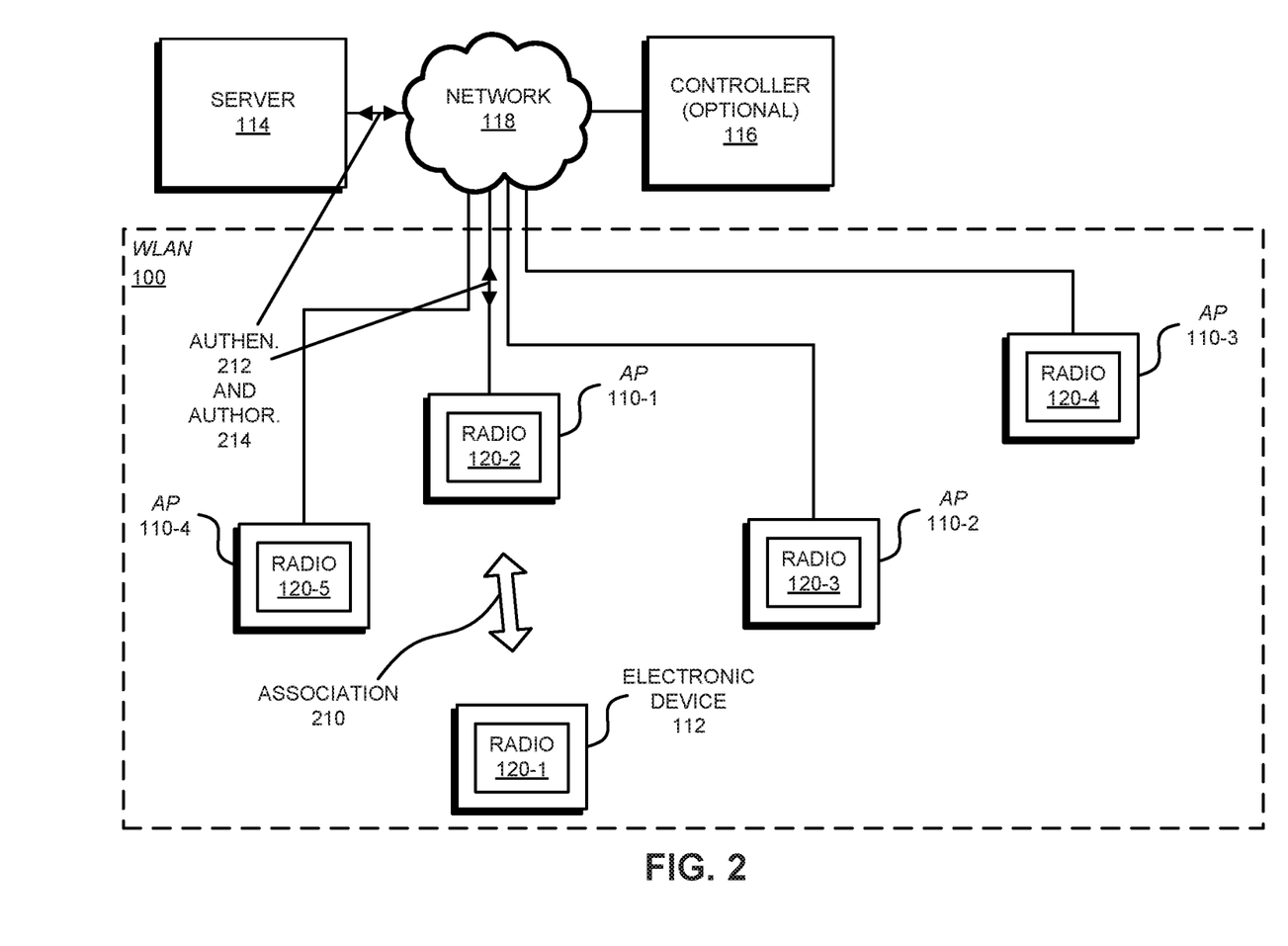
FIG. 2 is a drawing illustrating communication among the access points and the electronic device in the WLAN of FIG. 1 in accordance with an embodiment of the present disclosure.

Then, as shown in FIG. 2, which presents a drawing illustrating communication among access points 110 and electronic device 112 in WLAN 100 in accordance with some embodiments, access point 110-1 may associate 210 with electronic device 112. During the association, access point 110-1 may authenticate 212 electronic device 112 and authorize 214 its access to WLAN 100 with server 114 (such as a RADIUS server) via network 118.

Figure 3:
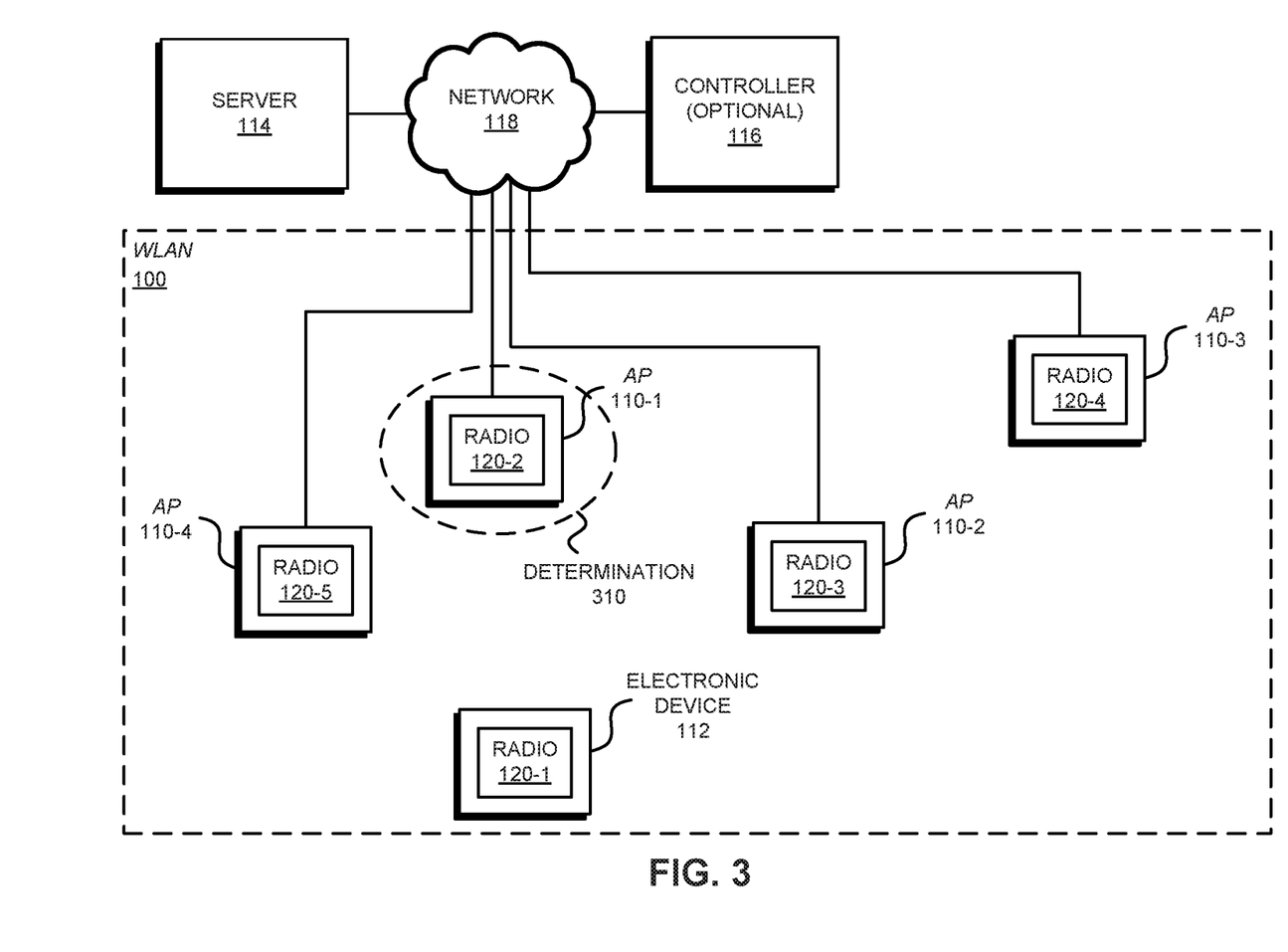
FIG. 3 is a drawing illustrating communication among the access points and the electronic device in the WLAN of FIG. 1 in accordance with an embodiment of the present disclosure.

Moreover, as shown in FIG. 3, which presents a drawing illustrating communication among access points 110 and electronic device 112 in WLAN 100 in accordance with some embodiments, after establishing a connection with electronic device 112 access point 110-1 may determine 310 that a BSS transition is warranted based on one or more criteria. For example, the one or more criteria may include when a number of associations with access point 110-1 exceeds a threshold value, such as when access point 110-1 has more than 10, 50 or 100 associations (or a large enough number of associations that the communication performance of access point 110-1 is degraded). More generally, the one or more criteria may include or may be based on operational information 124. Thus, the determination may be based on one or more communication-performance metrics. In particular, if one or more of the other access points has improved communication performance relative to that of access point 110-1 (such as a higher capacity), access point 110-1 may determine that a BSS transition is warranted.

Figure 4:
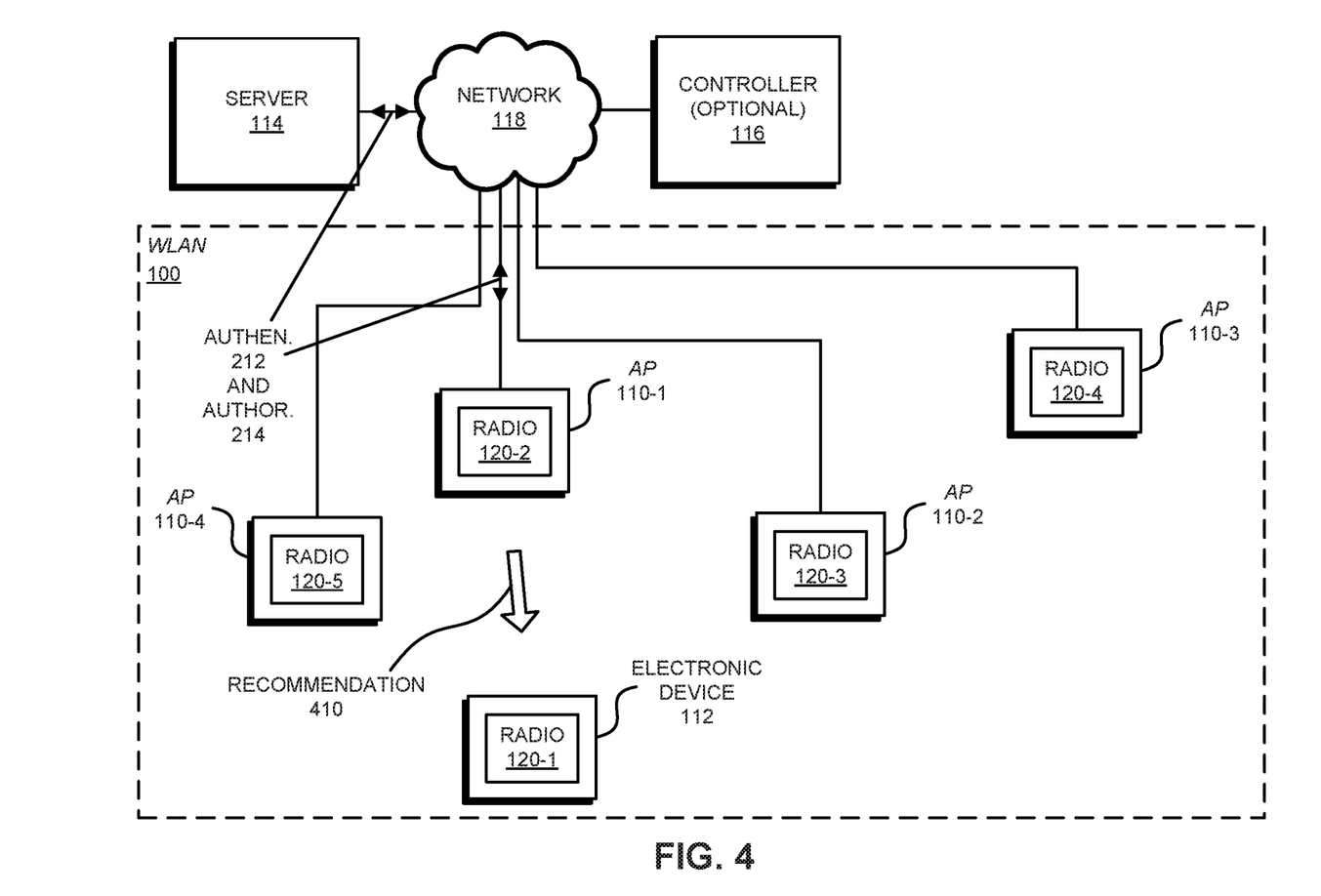
FIG. 4 is a drawing illustrating communication among the access points and the electronic device in the WLAN of FIG. 1 in accordance with an embodiment of the present disclosure.

Next, as shown in FIG. 4, which presents a drawing illustrating communication among access points 110 and electronic device 112 in WLAN 100 in accordance with some embodiments, access point 110-1 may recommend 410 one or more access points in the other access points for electronic device 112 to associate with based on operational information 124, so that electronic device 124 is able to obtain improved communication performance relative to that provided by access point 110-1. Thus, recommendation 410 may be based on one or more communication-performance metrics. In particular, if one or more of the other access points has improved communication performance relative to that of access point 110-1 (such as a higher capacity), access point 110-1 may recommend that electronic device 112 associated with one of these access points.

In this way, using the communication technique access point 110-1 may perform load balancing in WLAN 100 in order to improve the quality of service provided to electronic device 112.

In some embodiments, a subsequent BSS transition performed by electronic device 112 includes a fast BSS transition. In particular, when access point 110-1 associates with electronic device 112, access point 110-1 may be designated as a master access point for electronic device 112 in WLAN 100 (which is sometimes referred to as 'PMKR0'). For example, access point 110-1 may designate itself as the master if none of the other access points is already the master. Alternatively, an optional controller 116 for WLAN 100 may designate access point 110-1 as the master. Information that indicates access point 110-1 is the master may be provided to electronic device 112, server 114 and/or optional controller 116.

Next, in order to exchange data frames between access point 110-1 and electronic device 112, one or more keys in a key hierarchy may be established. In particular, access point 110-1 may request a pre-shared key (PSK) or a master session key (MSK) (and, more generally, a shared secret) from server 114 (or optional controller 116) when authenticating and authorizing electronic device 112. For example, the PSK may include Extensible Authentication Protocol (EAP) parameters that are provided by server 114. Then, access point 110-1 may generates a pairwise master key (PMK) associated with access point 110-1 and electronic device 112 (e.g., the PMK may be uniquely associated with access point 110-1 and electronic device 112). In particular, the PMK may be generated using a secure hashing function based on the PSK, such as HMAC-SHA256.

Furthermore, using a four-way handshake with electronic device 112, access point 110-1 and electronic device 112 may each independently calculate a pairwise transient key (PTK) to enable secure communication. In particular, the four-way handshake may be compatible with an IEEE 802.11i standard.

Figure 5:
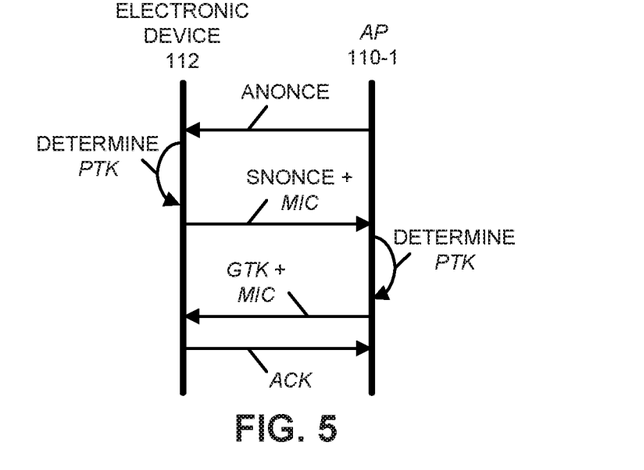
FIG. 5 is a drawing illustrating a four-way handshake between an access point and an electronic device in accordance with an embodiment of the present disclosure.

FIG. 5 presents a drawing illustrating a four-way handshake between access point 110-1 and electronic device 112 in accordance with some embodiments. The four-way handshake may allow access point 110-1 and electronic device 112 to independently prove to each other that they know the PSK/PMK without ever disclosing the key. In particular, instead of disclosing the key, access point 110-1 and electronic device 112 may each encrypt messages to each other. These messages may only be decrypted by using the PMK that they already share. Moreover, if decryption of the messages is successful, this proves knowledge of the PMK. Note that the four-way handshake may protect the PMK from malicious access points (such as an attacker's service set identifier impersonating a real access point) so that electronic device 112 never has provide its PMK to access point 110-1.

The PMK may last for the entire session and may be exposed as little as possible. Consequently, keys to encrypt traffic may need to be derived. In particular, the four-way handshake is used to establish another key called the PTK. In some embodiments, the PTK is generated by concatenating the following attributes: the PMK, a nonce (such as a random or a pseudorandom number) of access point 110-1 (which is sometimes denoted as 'ANonce'), another nonce (such as another random or another pseudorandom number) of electronic device 112 (which is sometimes denoted as 'SNonce'), a media access control (MAC) address of access point 110-1, and a MAC address of electronic device 112. Then, the product is used as an input to a pseudorandom function. Moreover, in some embodiments the four-way handshake also yields a group temporal key (GTK), which is used to decrypt multicast and broadcast traffic.

Note that the messages during the four-way handshake may be sent as EAP over LAN (EAPoL)-key frames. As shown in FIG. 5, access point 110-1 may send a nonce value (ANonce) to electronic device 112. Then, electronic device 112 may have all the attributes it needs to construct the PTK. Moreover, electronic device 112 may sent its own nonce value (SNonce) to access point 110-1 and optionally with a message integrity code (MIC), including authentication, which may be a message authentication and integrity code (MAIC).

Next, access point 110-1 may construct and sends the GTK and a sequence number together with another MIC. This sequence number may be used in the next multicast or broadcast frame, so that the receiving electronic device can perform basic replay detection. Furthermore, electronic device 112 may sends a confirmation to access point 110-1.

In some embodiments, the keys determined by access point 110-1 using the four-way handshake are used during fast BSS transition in accordance with IEEE 802.11r. In particular, access point 110-1 may generate a PMK that is referred to as the PMKR0Name, which may be generated or determined in accordance with IEEE 802.11r. In addition, access point 110-1 may generate and distribute secondary PMKs to RE-neighbor access points of access point 110-1 (e.g., access points 110-2). As was the case with the PMK in the four-way handshake, electronic device 112 may independently derive the secondary PMKs. Note that a given secondary PMK is sometimes referred to as a PMKR1Name. When distributing the secondary PMKs, access point 110-1 may include information that indicates access point 110-1 is the master access point in WLAN 100 for electronic device 112. Alternatively, access point 110-1 may provide the information to server 114 or optional controller 116, where is may be subsequently accessed by the other access points. In some embodiments, however, the master identity is implicit to or is specified by the secondary PMKs, such as the PMKR1Names (which are derived from the PMKR0Name).

Note that each of the secondary PMKs may be unique (e.g., a given secondary PMK may be unique to a given access point and the electronic device) and the secondary PMKs may facilitate fast BSS transitions with electronic device 112 when a handover occurs without using the four-way handshake to establish secure communication with electronic device 112. In particular, the RE-neighbor access points that receive the secondary PMKs may be able to establish secure communication with electronic device 112 without using the four-way handshake, thereby eliminating a time delay of up to 40 ms. In addition, by using the secondary PMKs, the other access points may not need to obtain the PSK from server 114.

For example, during a fast BSS transition electronic device 112 may: perform active or passive scanning for access point 110-2; exchange authentication messages with access point 110-2; and exchange association messages with access point 110-2 to establish a connection. The pre-distributed secondary PMK may eliminate the need for the PMK negotiation with server 114 (or optional controller 116). At this point, access point 110-2 and electronic device 112 have a connection, but may not be allowed to exchange data frames because they have not established a key. The PTK (as well as quality of service or QoS admission control to establish QoS streams) may be established between access point 110-2 and electronic device 112 without the four-way handshake by including the information used to determine the PTK (such as the access-point and the electronic-device nonces), as well as the QoS admission control exchanges, in the authentication and the association messages.

Note that by establishing secure communication without using the four-way handshake, the communication may eliminate a time delay of up to 40 ms during the handover. Thus, the time needed to establish secure communication between electronic device 112 and access point 110-2 may be reduced from 100 ms to 60 ms.

Moreover, note that the messages exchanged among access points 110 and electronic device 112 during the communication technique may have a type length value (TLV) format.

In an exemplary embodiment, during an initial mobility domain association an initial access point (which is also an authenticator) can act as a master or ROKH. It may derive the PMKR1 for itself and for each of its neighboring access points that an electronic device could roam to, and distributes the PMKR1 using secure access point-to-access point communications.

For example, two access points (AP2 and AP3) may be in the same mobility domain as another access point (AP1) and may also be the RF neighbors of AP1. Moreover, AP2 and AP4 may be RF neighbors and may also be in the same mobility domain. Consequently, an electronic device may roam and connect to any of these access points. If the electronic device associates to AP1, the authenticator residing in AP1 may derive the PMKR0 using the MSK/PSK, the service set identifier (SSID), the mobile domain identifier (MDID), the R0 key handler identification (ROKHID) and the S0 key handler identification (SOKHID). This authenticator also derives the PMKR1 for each of the neighboring access points (which may also act as a R1 key holders) using PMKR0, R1KHID and the SOKHID. Then, AP1 may distribute these keys (PMKR1), ROKHID, SOKHID to the neighboring R1KHs.

Additionally, note that venues often constrain user ingress areas (e.g., the building doorway, the exits, the building lobby/foyer, a passenger-train loading platform, a airport jetway, etc.). Likewise, there can be constrained walkways internal to a venue (e.g., at airport security, at elevator doorway, etc.). There is often one access point, serving a venue's ingress or walkway, that electronic devices associate with. This access point typically becomes the ROKH for each electronic device that joins the mobility domain. In order to distribute the ROKH's load, the ROKH may determine that a BSS transition is warranted. Then, the ROKH may recommend that the electronic device associate with another access point, such as AP2. After the ROKH receives information from AP2 that indicates that the electronic device has transitioned out to AP2, it may instruct AP2 to be the ROKH for this electronic device.

Figure 6:
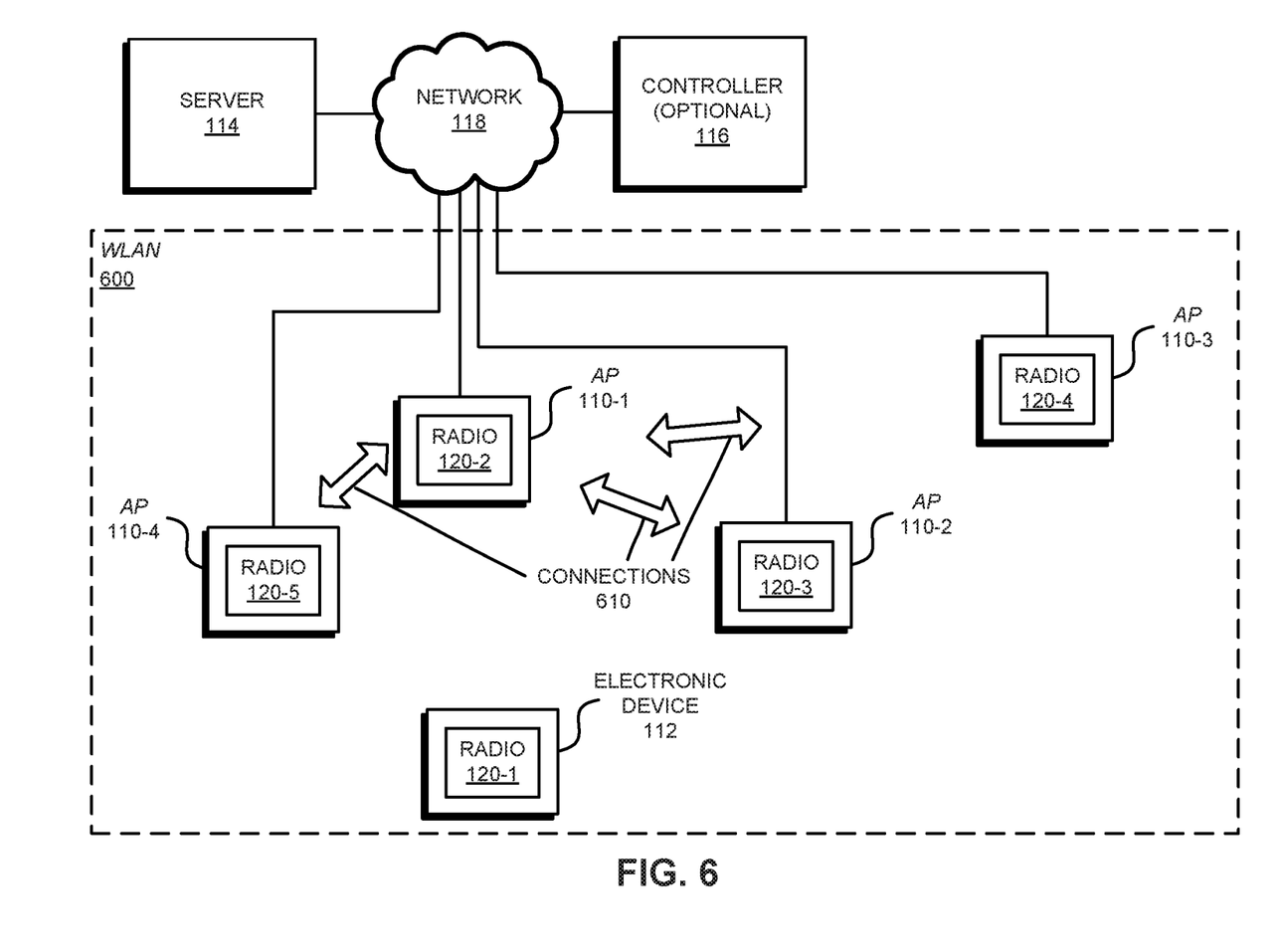
FIG. 6 is a drawing illustrating communication among access points in a WLAN in accordance with an embodiment of the present disclosure.

In some embodiments, variations on the communication technique are used to perform distributed management in WLAN 100, such as channel management (to help the access points select channels in order to reduce or eliminate interference) and/or establishing a mesh network with the other access points. FIG. 6 presents a drawing illustrating communication among access points in a WLAN 600 in accordance with some embodiments. In particular, access points 110 may establish connections 610 with each other in a mesh network without requiring that the topography of the RF neighborhood be predefined and/or that access points 110 be primed, in advance, with the necessary provisioning information. Thus, using the communication technique it may not be necessary for operators to manually install the provisioning information on access point 110.

For example, in the communication technique, access points 110 may optionally discover each other via wireless communication in WLAN 600. Then, access points 110 may exchange information about a topology of the RF neighborhood via dedicated connections. Alternatively or additionally, access points 110 may access information about locations of access points 110 and/or the topology of the RF neighborhood from optional controller 116.

Next, access points 110 may associate with each other to establish connections 610. During the association, access points 110 may determine keys that are used for secure communication using an approach that is compatible with IEEE 802.11i and/or IEEE 802.11r. Furthermore, access points 110 may exchange additional information using dedicated connections (via wired and/or wireless communication) to establish the mesh network. In some embodiments, access points 110 leverage the exchanged information about the topology of the RF neighborhood to avoid or prevent a network loop condition. Thus, while it is ok to 'connect', from the perspective of network packet forwarding, FIG. 6 should not be construed as to imply that a network loop condition exists, if this condition is detrimental to the network.

By using dedicated connections while establishing the mesh network, the communication technique may significantly decrease the time and the complexity (including the network traffic) needed to establish the mesh network. Therefore, the communication technique may address a long unmet need.

Note that a 'mesh network' may have a network topology in which each access point or node (which is sometimes called a 'mesh access point') relays data for the mesh network, and the nodes cooperate in the forwarding of data in the mesh network. Moreover, in a 'mesh network,' a path to a root access point, which is coupled to network 118 (such as the Internet and/or an intranet), contains at least one wireless connection that passes information from a client device in mesh network 112 to network 118. In some embodiments, the mesh network includes an access point that communicates with another access point in the mesh network using a wireless mesh link.

Figure 7:
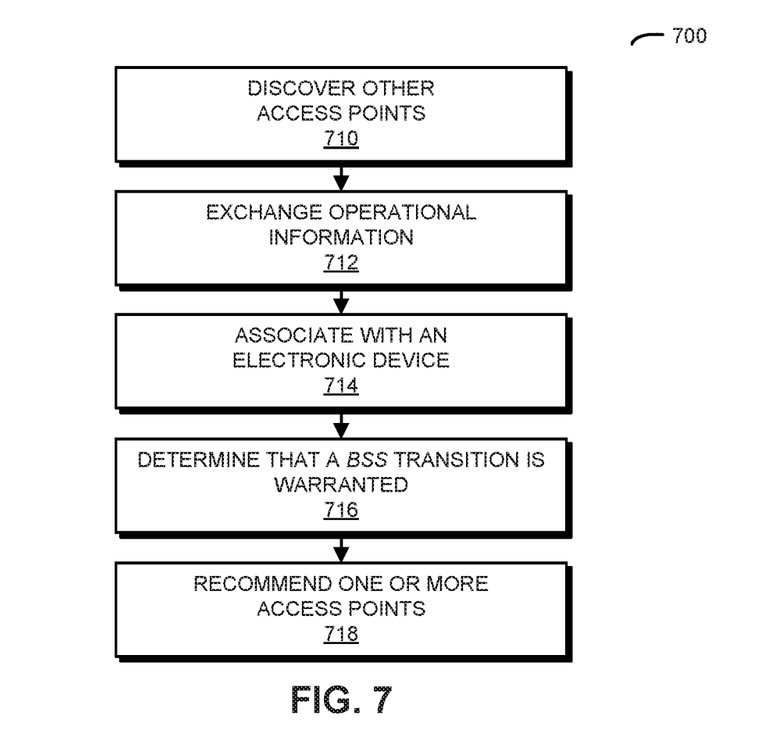
FIG. 7 is a flow diagram illustrating a method for facilitating improved service in a WLAN that includes an access point and other access points in accordance with an embodiment of the present disclosure.

We now describe embodiments of the method. FIG. 7 presents a flow diagram illustrating a method 700 for facilitating improved service in a WLAN that includes an access point and other access points in accordance with some embodiments, which may be performed by an access point, such as access point 110-1 in FIG. 1. During operation, the access point may discover the other access points (operation 710) in an RF neighborhood using wireless communication between the access point and the other access points. Note that the RF neighborhood may be based on an RF range of communication with the access point.

Then, the access point may exchange operational information (operation 712) with the other access points using dedicated connections between the access point and the other access points. Moreover, the operational information may include a capacity of a given access point and RF characteristics of operating channel(s) of the given access point (e.g., a multiband access point may have one operating channel in each band). For example, the capacity of the given access point may be based on a load and a throughput, and/or the RF characteristics may include information specifying a current operating channel, channel noise, channel utilization, etc. Note that the operation information may be exchanged within a time interval, so that the access point has situation awareness about communication performance of the other access points on a time scale corresponding to the time interval. In some embodiments, the operational information is exchanged on an ongoing basis, so that operations in method 700 can be performed dynamically, such as in real time or near real time. This may allow the access point, and the WLAN, to respond to dynamic changes in the RF environment based on current or topical operational information.

Subsequently, after the access point associates with the electronic device (operation 714), the access point may determine that a BSS transition is warranted (operation 716) based on one or more criteria. For example, the one or more criteria may include when a number of associations with the access point exceeds a threshold value.

Next, the access point may recommend one or more access points (operation 718) in the other access points for the electronic device to associate with based on the operational information, so that the electronic device is able to obtain improved communication performance relative to that provided by the access point.

In some embodiments of method 700, there may be additional or fewer operations. Furthermore, the order of the operations may be changed, and/or two or more operations may be combined into a single operation.

Figure 8:
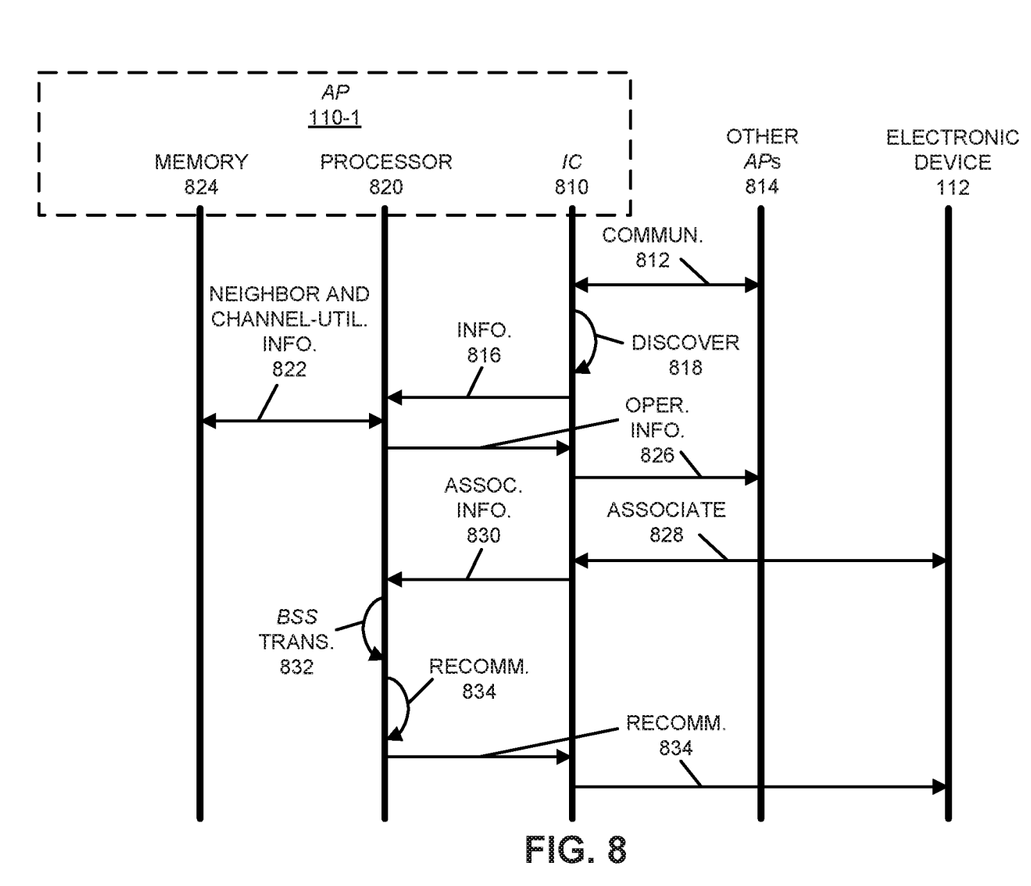
FIG. 8 is a drawing illustrating communication among the electronic devices in FIGS. 1 and 2 in accordance with an embodiment of the present disclosure.

Embodiments of the communication technique are further illustrated in FIG. 8, which presents a drawing illustrating communication among electronic device 112 and access points 110 in accordance with some embodiments. In particular, an interface circuit (IC) 810 in access point 110-1 may communicate 812 with other access points 814 in the WLAN, and based information 816 determined during this communication (such as reported RSSI values), interface circuit 810 may discover 818 the other access points 814. Moreover, processor 820 may determine, and then store in memory 824, neighbor and channel-utilization information 822 specifying access points in an RF neighborhood of access point 110-1.

Then, interface circuit 810 may exchange operational information 826 with the other access points 814 using dedicated connections.

Moreover, interface circuit 810 may associate 828 with electronic device 112. After receiving association information 830 from interface circuit 810 (which indicates that the association has occurred), processor 820 may determine that a BSS transition 832 is warranted. Next, via interface circuit 810, processor 820 may determine and then recommend 834 one or more access points in the other access points 814 for electronic device 112 to associate with based on operational information 826, so that electronic device 112 is able to obtain improved communication performance relative to that provided by access point 110-1.

While the preceding examples illustrated the communication technique with particular security protocols and encryption techniques and keys, more generally the communication technique may be used with a wide variety of security protocols and encryption techniques and keys.

We now describe embodiments of an electronic device, which may perform at least some of the operations in the communication technique. FIG. 9 presents a block diagram illustrating an electronic device 900 in accordance with some embodiments, such as one of access points 110, electronic device 112, server 114 or optional controller 116. This electronic device includes processing subsystem 910, memory subsystem 912, and networking subsystem 914. Processing subsystem 910 includes one or more devices configured to perform computational operations. For example, processing subsystem 910 can include one or more microprocessors, ASICs, microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program module 922 or operating system 924), which may be executed by processing subsystem 910. Note that the one or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more antennas 920 (or antenna elements). (While FIG. 9 includes one or more antennas 920, in some embodiments electronic device 900 includes one or more nodes, such as nodes 908, e.g., a pad, which can be coupled to the one or more antennas 920. Thus, electronic device 900 may or may not include the one or more antennas 920.) For example, networking subsystem 914 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program module 922 is included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. The integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 922, operating system 924 (such as a driver for interface circuit 918) or in firmware in interface circuit 918. Alternatively or additionally, at least some of the operations in the communication technique may be implemented in a physical layer, such as hardware in interface circuit 918.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
an interface circuit that is configured to communicate with an electronic device and other access points in a wireless local area network (WLAN), wherein the access point is configured to:
discover the other access points in a radio-frequency (RF) neighborhood by scanning supported RF channels using wireless communication between the access point and the other access points;
establish dedicated connections between the access point and the discovered other access points;
exchange operational information with the discovered other access points using the dedicated connections between the access point and the other access points;
associate with and provide wireless service to the electronic device;
determine that a basic-service-set (BSS) transition is warranted based on a criterion;
recommend one or more access points in the discovered other access points for the electronic device to associate with based on the operational information, so that the electronic device is able to obtain improved communication performance relative to that provided by the access point; and
distribute the operational information to the discovered other access points to enable roaming and reconnection.

2. The access point of claim 1, wherein the RF neighborhood is based on an RF range of communication with the access point.

3. The access point of claim 1, wherein the operational information includes a capacity of a given access point and RF characteristics of a channel.

4. The access point of claim 3, wherein the capacity of the given access point is based on a load and a throughput.

5. The access point of claim 3, wherein the RF characteristics include information specifying current operating channel(s), channel noise, and channel utilization.

6. The access point of claim 1, wherein the criterion includes when a number of associations with the access point exceeding a threshold value.

7. The access point of claim 1, wherein the operation information is exchanged within a time interval, so that the access point has situation awareness about communication performance of the discovered other access points on a time scale corresponding to the time interval.

8. The access point of claim 1, wherein the dedicated connections use one of: wireless communication, wired communication, and both.

9. The access point of claim 1, wherein the access point further comprises:
a processor, coupled to the interface circuit and memory, configured to execute a program module; and
the memory, coupled to the processor, configured to store the program module, wherein the program module includes instructions for at least some of the operations performed by the access point.

10. A method for facilitating improved service in a wireless local area network (WLAN) that includes an access point and other access points, wherein the method comprises:
- discovering the other access points in a radio-frequency (RF) neighborhood by scanning supported RF channels using wireless communication between the access point and the other access points;
- establishing dedicated connections between the access point and the discovered other access points;
- exchanging operational information with the discovered other access points using the dedicated connections between the access point and the discovered other access points;
- associating with and providing wireless service to the electronic device;
- determining that a basic-service-set (BSS) transition is warranted based on a criterion;
- recommending one or more access points in the discovered other access points for the electronic device to associate with based on the operational information, so that the electronic device is able to obtain improved communication performance relative to that provided by the access point; and
- distributing the operational information to the discovered other access points to enable roaming and reconnection.

11. The method of claim 10, wherein the RF neighborhood is based on an RF range of communication with the access point.

12. The method of claim 10, wherein the operational information includes a capacity of a given access point and RF characteristics of a channel.

13. The method of claim 12, wherein the capacity of the given access point is based on a load and a throughput.

14. The method of claim 12, wherein the RF characteristics include information specifying current operating channel(s), channel noise, and channel utilization.

15. The method of claim 10, wherein the criterion includes when a number of associations with the access point exceeding a threshold value.

16. The method of claim 10, wherein the operation information is exchanged within a time interval, so that the access point has situation awareness about communication performance of the discovered other access points on a time scale corresponding to the time interval.

17. The method of claim 10, wherein the dedicated connections use one of: wireless communication, wired communication, and both.

18. A computer-program product for use in conjunction with an access point, the computer-program product comprising a non-transitory computer-readable storage medium and a computer-program mechanism embedded therein to facilitate improved service in a wireless local area network (WLAN) that includes an access point and other access points, the computer-program mechanism including:
- instructions for discovering the other access points in a radio-frequency (RF) neighborhood by scanning supported RF channels using wireless communication between the access point and the other access points;
- instructions for establishing dedicated connections between the access point and the discovered other access points;
- instructions for exchanging operational information with the discovered other access points using the dedicated connections between the access point and the discovered other access points;
- instructions for associating with and providing wireless service to the electronic device;
- instructions for determining that a basic-service-set (BSS) transition is warranted based on a criterion;
- instructions for recommending one or more access points in the discovered other access points for the electronic device to associate with based on the operational information, so that the electronic device is able to obtain improved communication performance relative to that provided by the access point; and
- instructions for distributing the operational information to the discovered other access points to enable roaming and reconnection.

19. The computer-program product of claim 18, wherein the operational information includes a capacity of a given access point and RF characteristics of a channel.

20. The computer-program product of claim 18, wherein the criterion includes when a number of associations with the access point exceeding a threshold value.

* * * * *